(12) United States Patent
Takizawa

(10) Patent No.: US 9,106,074 B2
(45) Date of Patent: Aug. 11, 2015

(54) MULTILEVEL POWER CONVERTER

(71) Applicant: FUJI ELECTRIC CO., LTD, Kawasaki-shi (JP)

(72) Inventor: Satoki Takizawa, Hino (JP)

(73) Assignee: FUJI ELECTRIC CO., LTD. (JP)

(*) Notice: Subject to any disclaimer, the term of this patent is extended or adjusted under 35 U.S.C. 154(b) by 222 days.

(21) Appl. No.: 13/765,903

(22) Filed: Feb. 13, 2013

(65) Prior Publication Data

US 2013/0258728 A1 Oct. 3, 2013

(30) Foreign Application Priority Data

Apr. 2, 2012 (JP) .................................. 2012-083932

(51) Int. Cl.
| | |
|---|---|
| *H02M 1/32* | (2007.01) |
| *H02H 7/12* | (2006.01) |
| *H02M 7/487* | (2007.01) |
| *H02M 1/36* | (2007.01) |
| *H02M 7/797* | (2006.01) |

(52) U.S. Cl.
CPC .............. *H02H 7/1203* (2013.01); *H02M 1/32* (2013.01); *H02M 1/36* (2013.01); *H02M 7/487* (2013.01); *H02M 7/797* (2013.01)

(58) Field of Classification Search
CPC . G11B 2220/90; G11B 5/012; H02M 7/5387; H02M 7/487; H02M 7/483; H02M 1/36
USPC ........ 363/43, 50, 55, 56.01, 56.02, 56.05, 71, 363/131
See application file for complete search history.

(56) References Cited

U.S. PATENT DOCUMENTS

| | | | | |
|---|---|---|---|---|
| 5,047,913 | A | * | 9/1991 | De Doncker et al. ........... 363/95 |
| 5,621,634 | A | * | 4/1997 | Sato ................................ 363/98 |
| 6,278,626 | B1 | * | 8/2001 | Teichmann .................... 363/135 |
| 7,206,211 | B2 | * | 4/2007 | Blidberg et al. .............. 363/132 |
| 2004/0095790 | A1 | * | 5/2004 | Bakran et al. ................. 363/132 |
| 2008/0315859 | A1 | | 12/2008 | Ponnaluri et al. |
| 2013/0176014 | A1 | * | 7/2013 | Guan et al. .................... 323/311 |
| 2013/0270917 | A1 | * | 10/2013 | Yatsu .............................. 307/77 |
| 2014/0098587 | A1 | * | 4/2014 | Yatsu ............................ 363/131 |

FOREIGN PATENT DOCUMENTS

| | | |
|---|---|---|
| JP | 07-123729 A | 5/1995 |
| JP | 2009-525717 A | 7/2009 |
| JP | 2010-246187 A | 10/2010 |

* cited by examiner

*Primary Examiner* — Adolf Berhane
*Assistant Examiner* — Sisay G Tiku
(74) *Attorney, Agent, or Firm* — Rossi, Kimms & McDowell LLP

(57) ABSTRACT

Aspects of the invention address a circumstance in multilevel power converter devices having a bidirectional switch connected to a middle point of a DC power supply assembly, whereby interruption of the device may cause break down of semiconductor switches due to overvoltage if the semiconductor switches are totally interrupted simultaneously. In some aspects, a shut down procedure of a multilevel power converter device having a bidirectional switch connected to the middle point of a DC power supply assembly, gates of semiconductor switches are interrupted one by one according to a predetermined sequence or a sequence corresponding to the conditions of voltage and current at that moment with a time interval, and finally the bidirectional switch connected to the middle point of a DC power supply assembly is interrupted. As a result, a transition from an operating state to a shut down state can be made with minimum voltage variation.

4 Claims, 10 Drawing Sheets

S8 OFF

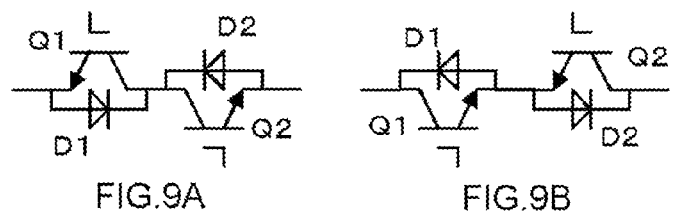
FIG.9A  FIG.9B
FIG. 10
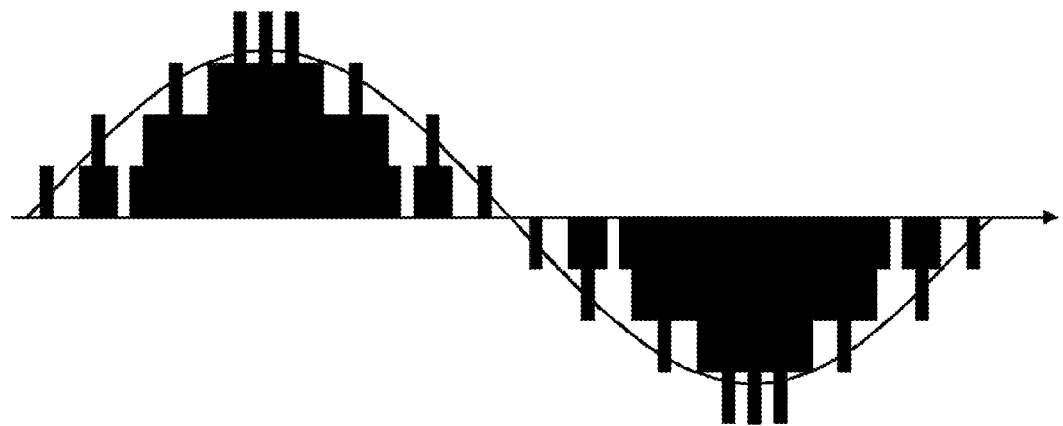

MULTILEVEL POWER CONVERTER

BACKGROUND OF THE INVENTION

1. Field of the Invention

Embodiments of the invention relate to control methods of multilevel power converters for converting DC power to AC power or converting AC power to DC power.

2. Description of the Related Art

FIG. 4 shows an example of a five-level inverter circuit that is a power converter circuit for converting DC to AC power. The reference numerals 1 and 2 designate series-connected DC power supplies with each voltage of 2Ed composing a DC power supply assembly having a positive terminal electric potential of P, a negative terminal electric potential of N, and a middle point electric potential of M. This DC power supply system can be generally constructed from an AC power supply system with two series-connected DC power supplies composed of a rectifier and a large capacitance capacitor, which are not shown in the figure.

The symbols S1, S7, S8, and S6 designate four semiconductor switches of IGBTs, each having an antiparallel-connected diode, series-connected between the P side electric potential and the N side electric potential. The Symbols S2 and S5 designate IGBTs, each having an antiparallel-connected diode, connected between the connection point of the IGBTs S1 and S7 and the connection point of the IGBTs S8 and S6, respectively. The symbol S9 designates a bidirectional semiconductor switch connected between a series-connection point, the M electric potential, of the DC power supplies 1 and 2 and the series-connection point of the IGBTs S7 and S8. The bidirectional semiconductor switch can be composed by antiparallel connection of reverse-blocking IGBTs as shown in FIG. 4, or by combination of IGBTs Q1 and Q2 without reverse-blocking ability having diodes D1 and D2 as shown in FIGS. 9A and 9B. FIG. 9A shows the IGBT Q1 and the IGBT Q2 with commonly connected collectors and FIG. 9B shows the IGBT Q1 and the IGBT Q2 with commonly connected emitters.

The reference numeral 10 designates a capacitor so-called flying capacitor that is controlled to have an averaged voltage of Ed across the capacitor and produces an output at a middle electric potential of the DC power supply 1 or 2 utilizing charging and discharging phenomena of the capacitor. The circuit 11U of these components is a circuit for a U-phase. A circuit 11V for a V-phase and a circuit 11W for a W-phase can be similarly formed to construct a three-phase inverter.

Reference numeral 12 designates an AC electric motor, an example of load on this inverter system. The inverter of this circuit construction delivers five levels of output at the output terminal 13 of this converter: a P potential, N potential, M potential, and two other intermediate potentials P potential (2 Ed)−Ed and N potential (−2 Ed)+Ed of the DC power supply 1 or 2 utilizing the ON/OFF operation of the semiconductor switches and the voltage across the capacitor 10. FIG. 10 shows an example of waveform of the output voltage Vout.

This inverter of five levels of output, as compared with an inverter of two-level type, generates smaller harmonics components of low order and reduced switching loss in the semiconductor switches. Thus, a system with high efficiency can be constructed.

FIGS. 5 and 6 show circuits of basic form of multilevel conversion circuit such as the five level converter of FIG. 4. The circuit of FIG. 5 has a construction of the circuit of FIG. 4 from which the IGBTs S2 and S5 are removed. The circuit of FIG. 6 has a construction in which the function of the IGBTs S7 and S9 in FIG. 4 is performed by the bidirectional switch S12 and the function of the IGBTs S8 and S9 is performed by the bidirectional switch S13. Five or more levels of multilevel converter circuit can be obtained by adding a converting circuit(s) comprising semiconductor switches(s) between the terminals 16 and 17 in FIG. 5 or between the terminals 18 and 19 in FIG. 6. The circuit of FIG. 4 is an example of adding the IGBTs S2 and S5 between the terminals 16 and 17 of FIG. 5.

FIG. 7 shows a first example of seven-level inverter circuit as an application of the multilevel converter circuit. With the DC power supply voltage of 3Ed×2, output of seven levels of electric potentials can be obtained by connecting a capacitor 20 charged at one unit of voltage Ed between the collector of the IGBT S3 and the emitter of the IGBT S4 and connecting a capacitor 21 charged at two units of voltage 2Ed between the collector of the IGBT S2 and the emitter of the IGBT S5.

FIG. 8 shows a circuit construction having all the switching elements exhibiting the same withstand voltage. The circuit of FIG. 7 needs four series connection of such switches for each of the IGBTs S1 and S6 in FIG. 7, and two series connection of such switches for each of the IGBTs S7 and S8 in FIG. 7. In order for each element to bear equal voltage in a static condition of this circuit, dividing resistors (not shown in the figure) are generally connected in parallel with the IGBTs. However, the provision of such dividing resistors is not directed to accomplish equal voltage sharing in a dynamic condition such as in a switching process. Therefore, another measure is needed to cope with the equal voltage sharing in the switching process. FIG. 11 shows a variation of a seven level converter circuit in which a capacitor 22 charged at a one unit of voltage Ed is connected between the connection point of the IGBT S7a and the IGBT S7b in FIG. 8 (the connection point of the IGBT S10 and the IGBT S7 in FIG. 11) and the connection point of the IGBT S8a and the IGBT S8b in FIG. 8 (the connection point of the IGBT S8 and the IGBT S11 in FIG. 11).

Japanese Patent Application No. JP 2009-525717, for example, discloses examples of a five level inverter circuit and the basic circuits of multilevel circuits.

When a total phase interruption is forcedly conducted in a system shut down in a system of multilevel circuit of three or higher levels, for example the seven level circuit shown in FIG. 12A, from a normal operation in which the IGBTs S1a through S1d, S2, and S3 are in the ON state and an electric current is flowing to the AC output, gate interruption is conducted simultaneously for every IGBT of S1a through S1d, S2 and S3. The current is transferred, as shown in FIG. 12B, to the diodes that are antiparallel-connected to the IGBTs S4, S5, and S6a through S6d. At this time, the circuit between the collector of the IGBT S1a and the emitter of the IGBT S3 is subjected to a voltage over 6Ed including transient surge voltage.

Although the series-connected circuit of the IGBTs S1a through S1d is subjected to a voltage of at least 4Ed, if the voltage is equally shared by each of the series-connected elements, each elements undergoes a voltage of about one unit Ed. Actually, unbalance in voltage sharing may occur due to scattering of signal transmission time of the gate circuit for driving these series-connected IGBTs and variation of switching characteristics of the IGBTs. As a consequence, a specific one of the IGBTs may be subjected to an overvoltage, resulting in breakdown of the element.

The breakdown of the semiconductor switches could be avoided even in the condition of unbalanced voltage if elements of high withstanding voltage are employed. Such a measure, however, has problems of large size and high cost.

Thus, there is a need in the art for improved converter equipment and semiconductor switches.

SUMMARY OF THE INVENTION

Embodiments of the invention address these and other needs. Some embodiments provide multilevel power converter equipment in which the semiconductor switches composing the equipment are so interrupted in shut down of the equipment that the semiconductor switches are prevented from being subjected to an overvoltage, and thereby downsizing and cost reduction of the equipment are achieved without employing semiconductor switching elements having high withstanding voltage.

In some embodiments, a multilevel power converter for converting DC power to AC power or AC power to DC power can comprise: a DC power supply assembly having a positive terminal, a negative terminal, and a middle point terminal at a middle electric potential between the positive terminal and the negative terminal; and a circuit for one phase including: a series-connected semiconductor switch circuit of at least four semiconductor switches each having an antiparallel-connected diode, the series-connected semiconductor switch circuit being connected between the positive terminal and the negative terminal of the DC power supply, a bidirectional switch capable of bidirectional switching connected between the middle point terminal of the power supply assembly and an intermediate connection point of the series-connected semiconductor switch circuit, and a circuit including a semiconductor switch(es) connected between each of two output terminals outputting a potential of each connection point of the semiconductor switches in the series-connected semiconductor switch circuit and a terminal of the bidirectional switch, the terminal being at a side unconnected to the DC power supply assembly, and a capacitor connected between the two output terminals; wherein the multilevel power converter is shut down in a procedure of interrupting the semiconductor switches according to a predetermined sequential operation and finally interrupting the bidirectional switch.

In some embodiments of the invention, the sequential operation to interrupt the semiconductor switches is carried out one by one with a predetermined time interval between interruption processes of each switch in an ON state.

In some embodiments, T the multilevel power converter is a five or more levels of power converter.

In a shut down procedure of a multilevel power converter according to some embodiments of the invention, semiconductor switches are interrupted one by one according to a predetermined operation sequence, and finally the bidirectional switch connected to the middle point of a DC power supply assembly is interrupted. This procedure can prevent any one of the semiconductor switches from being subjected to a high voltage even at a total interruption of the semiconductor switches in the forced shut down. Therefore, small-sized equipment can be constructed at a low cost owing to utilization of switches with low withstanding voltage.

BRIEF DESCRIPTION OF DRAWINGS

FIGS. 9A and 9B show examples of construction of a bidirectional switch;

FIG. 10 shows an example of waveform of the output line voltage Vout of a five level inverter;

DETAILED DESCRIPTION

In some embodiments of the invention, a multilevel power converter having a bidirectional semiconductor switch connected to the middle point at a middle electric potential of the DC power supply assembly, the gates of the semiconductor switches are interrupted sequentially with a time interval according to a predetermined sequence or a sequence corresponding to the voltage and current at the moment of operation, and the finally interrupted semiconductor switch is the bidirectional semiconductor switch connected to the middle point of the DC power supply assembly. This operation scheme can facilitate a transition from an operating state to a shut down state in the minimum voltage variation.

Embodiment 1

Figure 1:
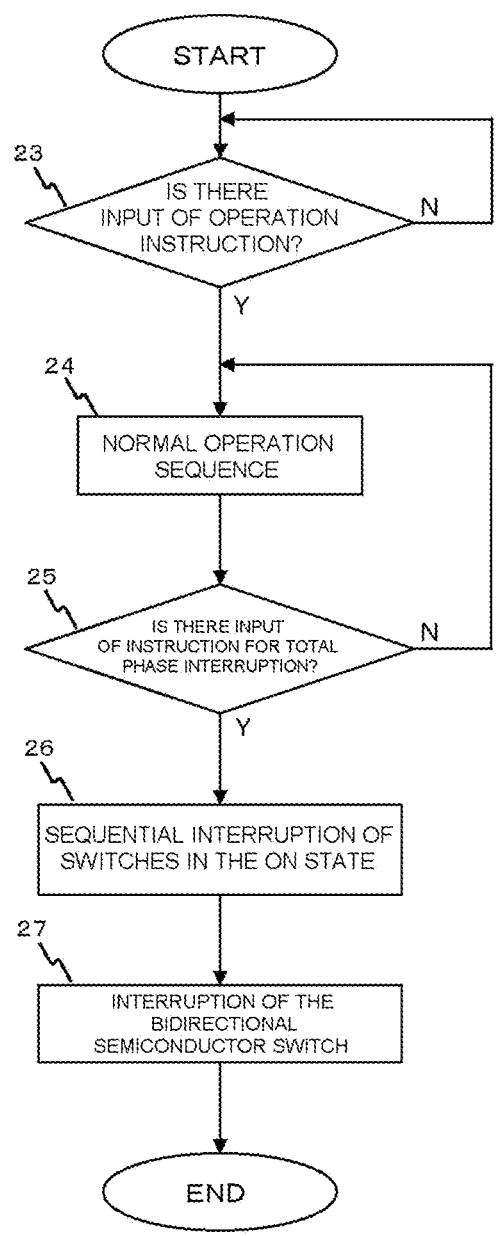
FIG. 1 is a flow chart showing an example of a process flow in accordance with embodiments of the invention.

FIG. 1 is an operational flow chart to shut down the main circuit from a normal operating state in an embodiment of the present invention. When an operation instruction is given in the block 23, during the normal operation of block 24, a decision is made in block 25 whether total phase interruption is conducted for forced shut down. If the total phase interruption is not instructed, the operation scheme returns to the normal operation of block 24.

If the total phase interruption is to be conducted, the switches in the ON state are sequentially interrupted with a predetermined time interval according to a predetermined sequence in block 26. The final step, block 27, interrupts the bidirectional semiconductor switch connected to the middle electric potential point of the DC power supply assembly. This bidirectional semiconductor switch corresponds to the switch S9 in the main circuit shown in FIG. 2.

Figure 2A:
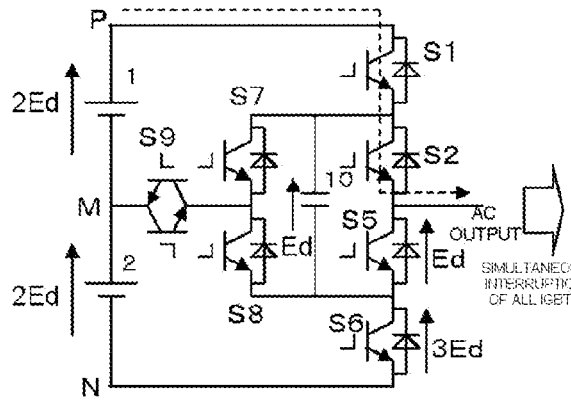
FIGS. 2A through 2E illustrate a first operation example on interruption of a five level power conversion circuit, in accordance with embodiments of the invention.
Figure 4:
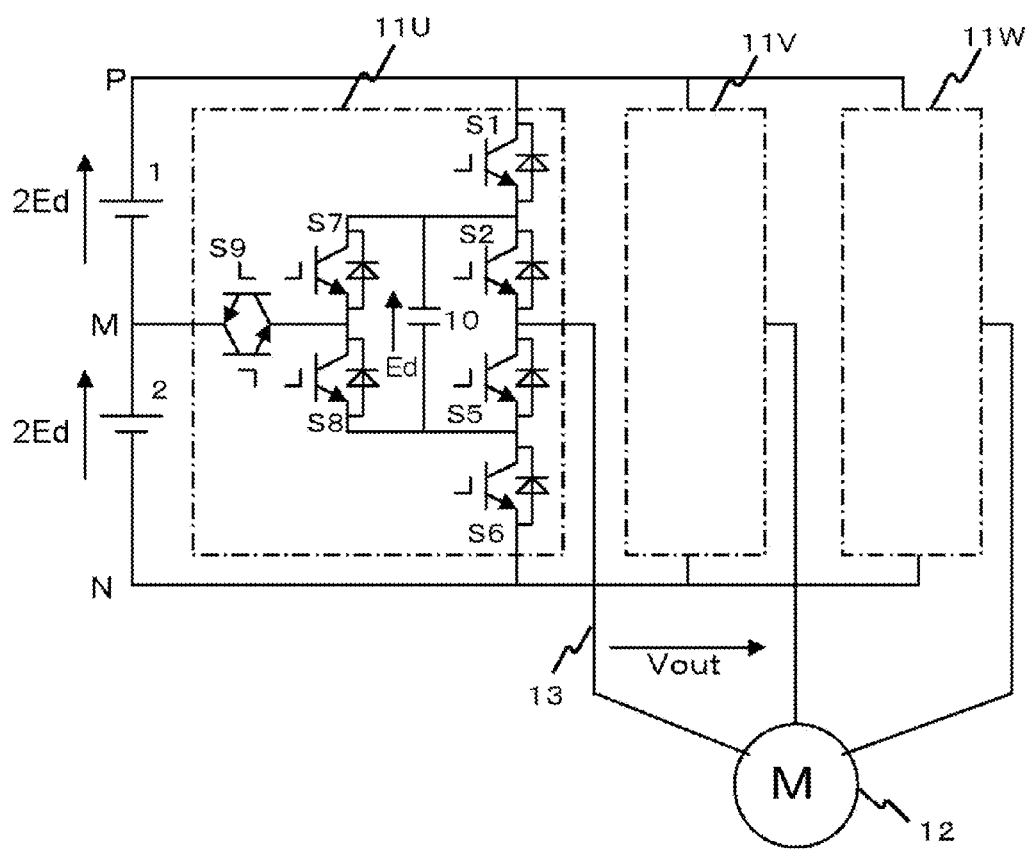
FIG. 4 shows an example of an inverter circuit of a five level power conversion circuit.

FIGS. 2A through 2E illustrate a first operation example on interruption of a five level power conversion circuit. The circuit construction is the same as FIG. 4 and description thereon is omitted. FIG. 2A shows IGBTs S1 and S2 in the ON state. If all the IGBTs S1 and S2 in the conducting state are interrupted simultaneously according to the total phase interruption instruction, the five level conversion circuit becomes the state of FIG. 2E which is a mode with the current circulating through the diodes of the IGBTs S5 and S6. In this operation process, the IGBT S1 is subjected to voltage 3Ed, and actually a superimposed surge voltage added, the voltage 3Ed being the power supply voltage 2Ed×2 subtracted by the voltage Ed across the capacitor 10. When the IGBT S1 is constructed in a series-connection structure, device breakdown may occur due to voltage unbalance.

To cope with this problem, the interruption procedure is conducted in the sequence of IGBT S1→IGBT S2→IGBT S8 with a certain predetermined time interval, and finally the bidirectional switch S9 is interrupted. In this procedure, each switched IGBT is equally subjected to the voltage Ed plus surge voltage assuming the IGBT S1 and the IGBT S6 are series-connected. Here, although the IGBT S1 and the IGBT S6 undergoes statically a voltage of 2Ed or 3Ed, voltage sharing can be performed with parallel-connected resistors.

The following describes the interruption operation in the sequence of IGBT S1→IGBT S2→IGBT S8.

Figure 2E:
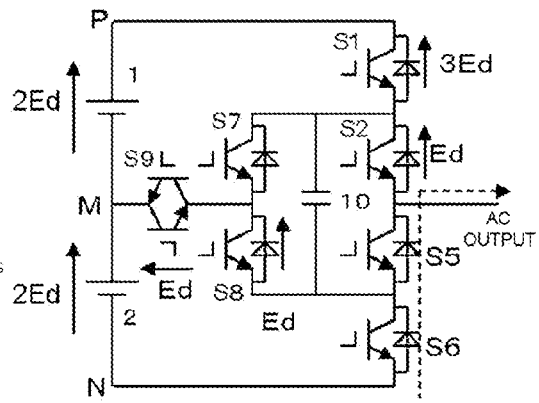
Figure 2B:
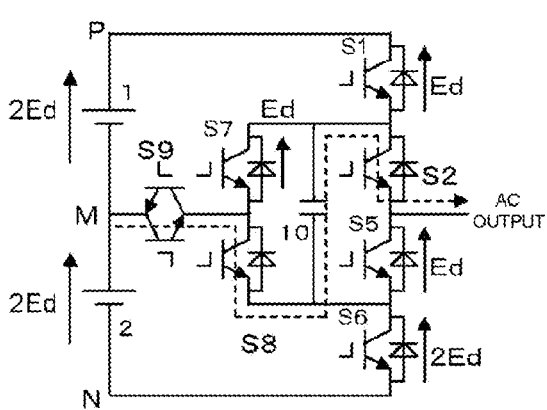

When the IGBT S1 is turned OFF from the state with the IGBTs S1 and S2 in the ON state as shown in FIG. 2A in which the AC output terminal delivers the voltage 2Ed of the DC power supply 1, the current that has been flowing through the IGBTs S1 and S2 is transferred, as shown by the broken line in FIG. 2B, to the path of: point M of the DC power supply assembly→bidirectional IGBT S9→IGBT S8→capacitor 10→IGBT S2→AC output terminal. Here, the voltage at the AC output terminal is the voltage Ed of the capacitor 10. The IGBT S1 undergoes the voltage Ed which is the voltage 2Ed of the DC power supply 1 subtracted by the voltage Ed of the capacitor 10.

Figure 2D:
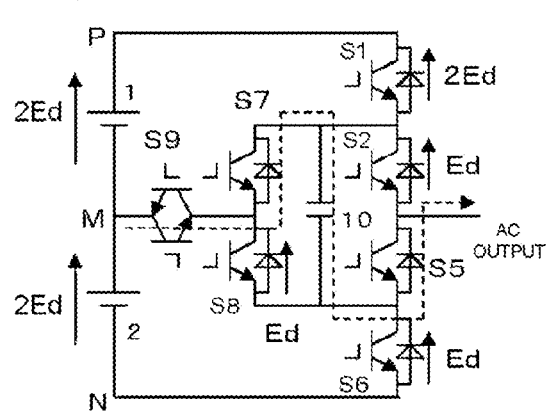
Figure 2C:
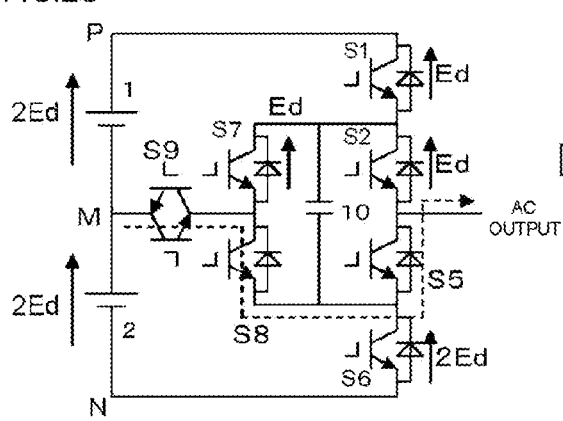
Figure 2C:
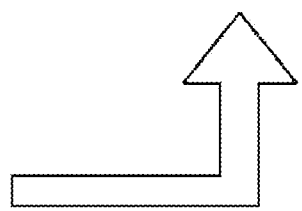

When the IGBT S2 is turned OFF from this state, the current that has been flowing through the IGBT S2 is transferred, as shown by the broken line in FIG. 2C, to the path: the point M of the DC power supply assembly→bidirectional IGBT S9→IGBT S8→the diode of IGBT S5→AC output terminal. Here, the AC output voltage is equal to the electric potential M at the middle point of the DC power supply assembly. The IGBT S2 undergoes the voltage Ed of the capacitor 10.

When the IGBT S8 is turned OFF from this state, the current that has been flowing through the IGBT S8 is transferred, as shown by the broken line in FIG. 2D, to the path: the point M of the DC power supply assembly→bidirectional IGBT S9→the diode of the IGBT S7→capacitor 10→the diode of the IGBT S5→AC output terminal. Here, the electric potential at the AC output terminal is the voltage−Ed which is the electric potential at the point M, which is zero, subtracted by the voltage Ed of the capacitor 10. The IGBT S8 undergoes the voltage Ed of the capacitor 10.

When the bidirectional IGBT S9 is turned OFF, the load current of the AC output is transferred to the path through the diode of the IGBT S5 and the diode of the IGBT S6 as shown in FIG. 2E. Here, the bidirectional IGBT S9 undergoes the voltage Ed. The IGBTs that are turned OFF undergo only one unit of voltage Ed. Therefore, circuit interruption is securely carried out without using semiconductor switches having high withstanding voltage.

Embodiment 2

FIG. 3 shows another example of an operation in the total phase interruption of the five level converter circuit. The circuit construction is similar to the construction of the circuit shown in FIG. 4, and thus, description thereon is omitted. Although in the operation example of FIGS. 2A through 2E, the IGBT S1 is first turned OFF from the state with the IGBTs S1 and S2 in the ON state, the IGBT S2 is first turned OFF in the operation of this Embodiment 2. FIG. 3A shows the IGBTs S1 and S2 in the conducting state. If all the IGBTs S1 and S2 are simultaneously interrupted according to a total phase interruption instruction, the current is transferred to flow in the mode shown in FIG. 3E where the current circulates through the diode of the IGBT S5 and the diode of the IGBT S6. Here, the IGBT S1 is subjected to the voltage 3Ed, and actually superimposed surge voltage added, which is the voltage 2Ed×2 of the DC power supply assembly subtracted by the voltage Ed of the capacitor 10. Thus, the semiconductor element may break down due to unbalance of voltage when the IGBT S1 is constructed in a series-connected structure.

To cope with this problem, the interruption procedure is conducted in the sequence of IGBT S2→IGBT S1→IGBT S8 with a certain predetermined time interval, and finally the bidirectional switch S9 is interrupted. In this procedure, each switched IGBT is equally subjected to the voltage Ed plus surge voltage assuming the IGBT S1 and the IGBT S6 are series-connected. Here, although the IGBT S1 and the IGBT S6 undergoes statically a voltage of 2Ed or 3Ed, voltage sharing can be performed with parallel-connected resistors.

The following describes the interruption operation in the sequence of IGBT S2→IGBT S1→IGBT S8.

Figure 3A:
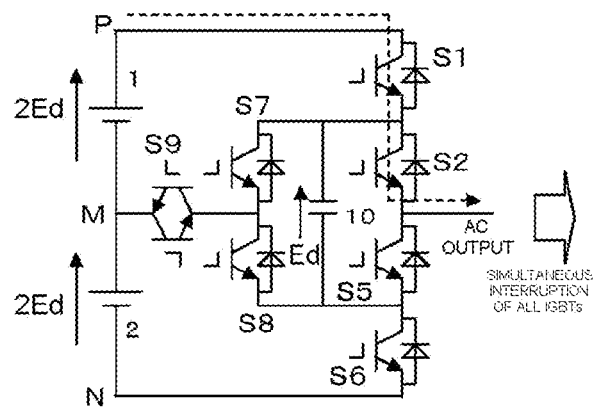
FIGS. 3A through 3E illustrate a second operation example on interruption of a five level power conversion circuit, in accordance with embodiments of the invention.
Figure 3E:
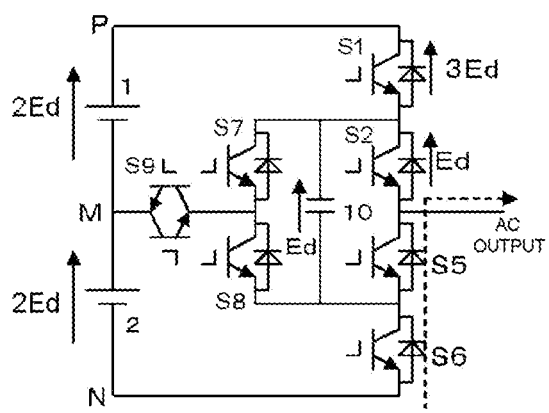
Figure 3B:
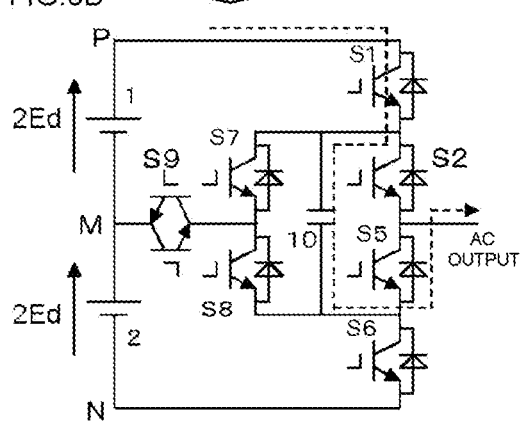

When the IGBT S1 is turned OFF from the state with the IGBTs S1 and S2 in the ON state as shown in FIG. 3A in which the AC output terminal delivers the voltage 2Ed of the DC power supply 1, the current that has been flowing through the IGBTs S1 and S2 is transferred, as shown by the broken line in FIG. 3B, to the path of: point P of the DC power supply assembly→IGBT S1→capacitor 10→the diode of the IGBT S5→AC output terminal. Here, the voltage at the AC output terminal is the voltage Ed which is the voltage 2Ed of the power supply 1 subtracted by the voltage Ed of the capacitor 10. The IGBT S2 is subjected to the voltage Ed of the capacitor 10.

Figure 3D:
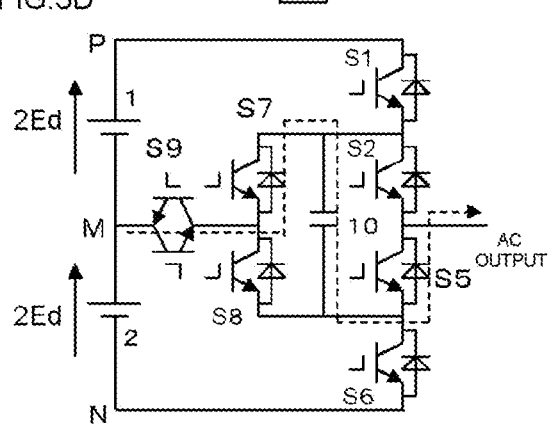
Figure 3C:
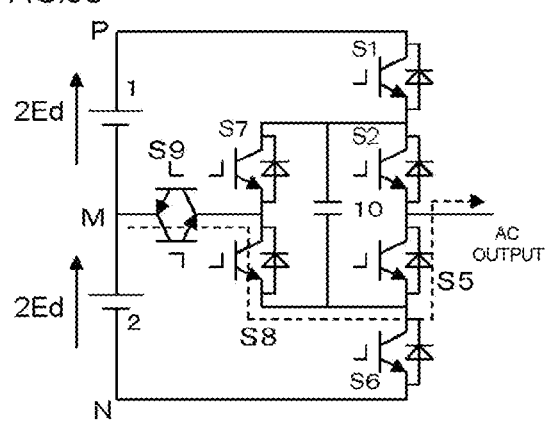
Figure 3C:
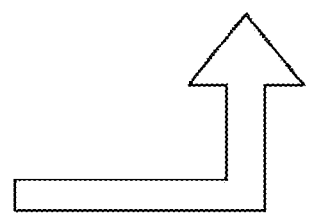

When the IGBT S1 is turned OFF from this state, the current that has been flowing through the IGBT S1 is transferred, as shown by the broken line in FIG. 3C, to the path: the point M of the DC power supply assembly→bidirectional IGBT S9→IGBT S8→the diode of IGBT S5→AC output terminal. Here, the AC output voltage is equal to the electric potential M at the middle point of the DC power supply assembly. The IGBT S1 undergoes the voltage Ed which is the voltage 2Ed of the DC power supply 1 subtracted by the voltage Ed of the capacitor 10.

When the IGBT S8 is turned OFF from this state, the current that has been flowing through the IGBT S8 is transferred, as shown by the broken line in FIG. 3D, to the path: the point M of the DC power supply assembly→bidirectional IGBT S9→the diode of the IGBT S7→capacitor 10→the diode of the IGBT S5→AC output terminal. Here, the electric potential at the AC output terminal is the voltage−Ed which is the electric potential at the point M, which is zero, subtracted by the voltage Ed of the capacitor 10. The IGBT S8 undergoes the voltage Ed of the capacitor 10.

When the bidirectional IGBT S9 is turned OFF, the load current of the AC output is transferred to the path through the diode of the IGBT S5 and the diode of the IGBT S6 as shown in FIG. 3E. Here, the bidirectional IGBT S9 undergoes the voltage Ed. The IGBTs that are turned OFF undergo only one unit of voltage Ed. Therefore, circuit interruption is securely carried out without using semiconductor switches having high withstanding voltage.

In either example of operation, interruption of IGBTs is conducted according to a certain sequence and the bidirectional switch of IGBT 9 is finally interrupted. According to this procedure of interruption, every semiconductor switch is subjected only to the voltage Ed plus surge voltage in the process of switching OFF.

Figure 5:
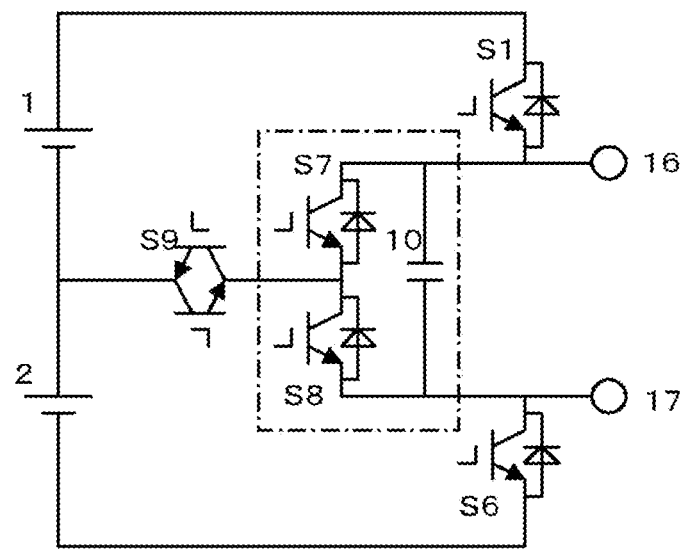
FIG. 5 shows a first basic form of a multilevel power conversion circuit.
Figure 6:
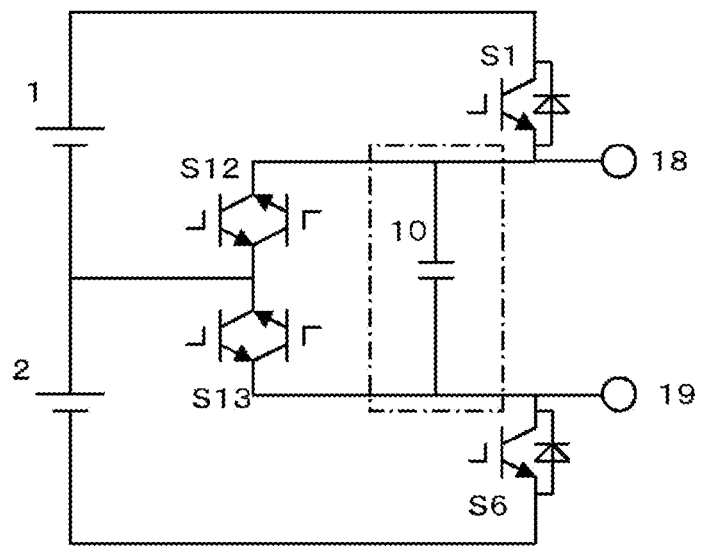
FIG. 6 shows a second basic form of a multilevel power conversion circuit.
Figure 7:
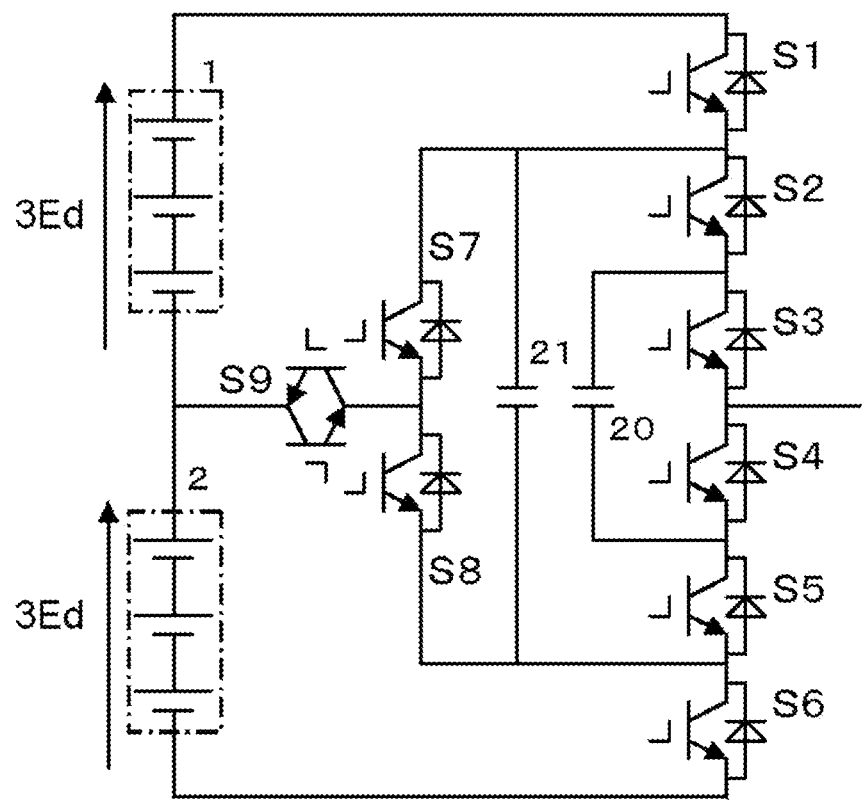
FIG. 7 shows an example of seven level power conversion circuit using the first basic form of a multilevel power conversion circuit.
Figure 8:
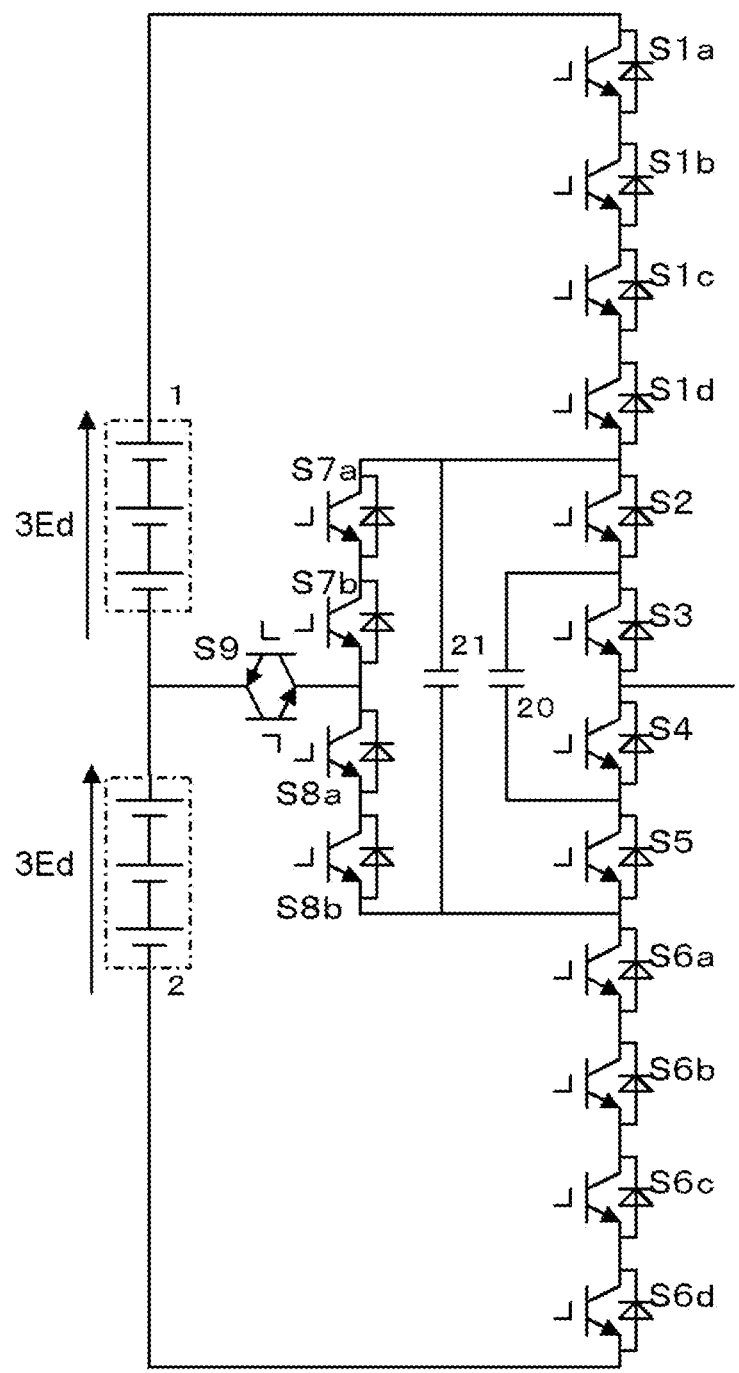
FIG. 8 shows an example of seven level power conversion circuit having the semiconductor switches with the same withstand voltage.
Figure 11:
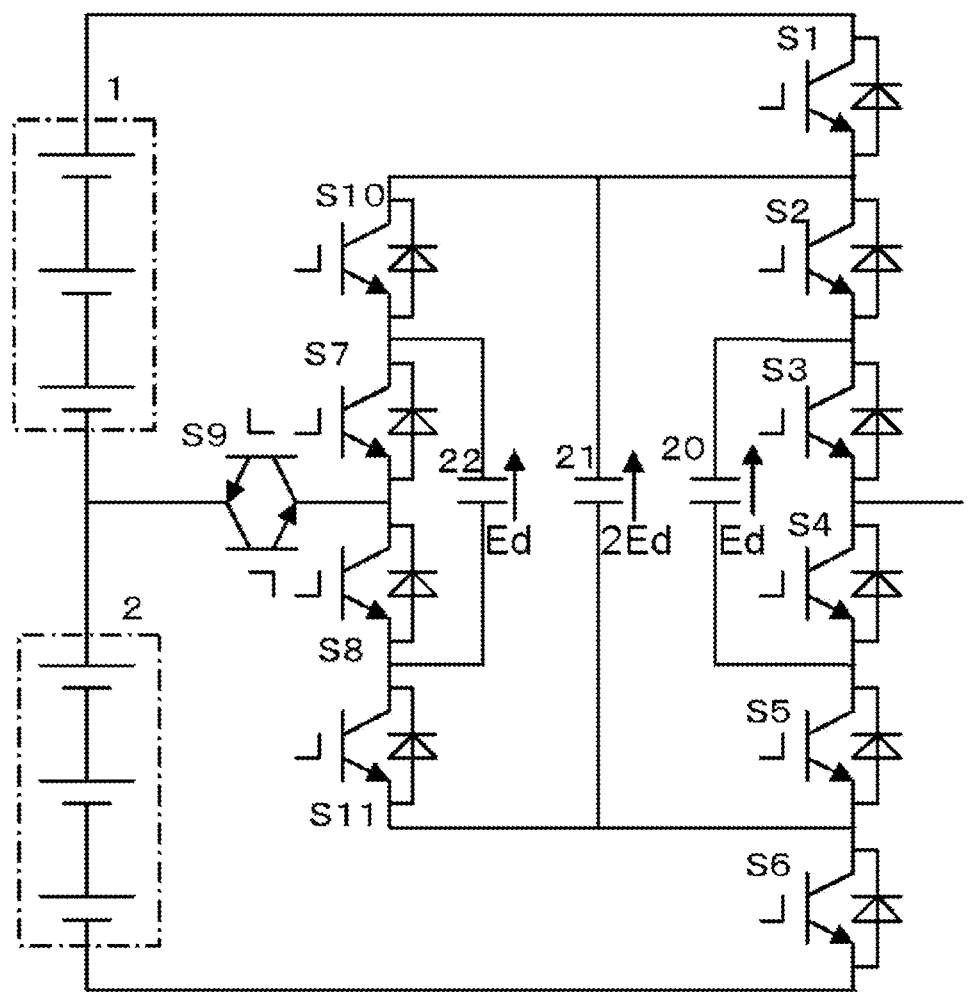
FIG. 11 shows a variation of a seven level power conversion circuit.
Figures 12A, 12B:
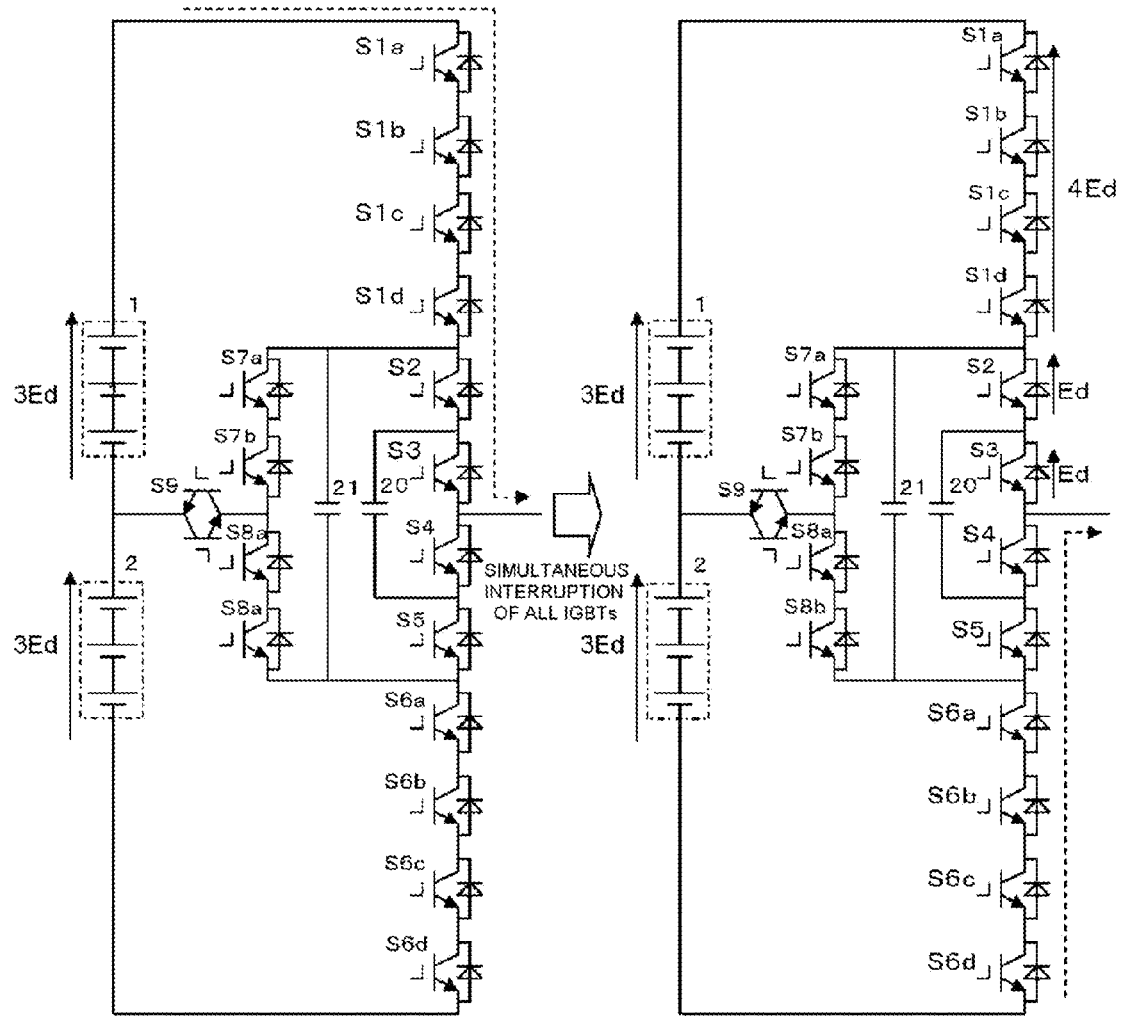
FIGS. 12A and 12B show an example of operation in the process of interruption in a seven level power conversion circuit.

The multilevel converter circuits of the embodiments described above are a five level conversion circuit and a seven level conversion circuit. Embodiments of the invention, however, can be applied to multilevel converters of nine or higher levels that is constructed based on the base circuit of FIG. 5 or FIG. 6 and has a bidirectional switching element connected to the point M of middle electric potential of a DC power supply assembly. Although the above description is made about a circuit that converts DC power to AC power, the present invention can be applied to circuits that convert AC power to DC power.

Embodiments of the invention relate to a circuit technology of devices such as high voltage inverters for generating a multilevel high voltage AC from a few number of DC power supplies and DC power supplies for generating multilevel DC voltages from a high voltage AC power supply, and can be applied to high voltage motor driving equipment and inverters for grid-connection.

Examples of specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the above description, specific details are set forth in order to provide a thorough understanding of embodiments of the invention. Embodiments of the invention may be practiced without some or all of these specific details. Further, portions of different embodiments and/or drawings can be combined, as would be understood by one of skill in the art.

This application is based on, and claims priority to, Japanese Patent Application No. 2012-083932, filed on Apr. 2, 2012, contents of which are incorporated herein by reference.

What is claimed is:

1. A multilevel power converter, for converting DC power to AC power or AC power to DC power, comprising:
   a DC power supply assembly having a positive terminal, a negative terminal, and a middle point terminal at a middle electric potential between the positive terminal and the negative terminal; and
   a circuit for one phase including:
      a series-connected semiconductor switch circuit of at least four semiconductor switches each having an antiparallel-connected diode, the series-connected semiconductor switch circuit being connected between the positive terminal and the negative terminal of the DC power supply assembly,
      a bidirectional switch capable of bidirectional switching connected between the middle point terminal of the power supply assembly and an intermediate connection point of the series-connected semiconductor switch circuit, and
      a circuit including a one or more semiconductor switches connected between each of two output terminals outputting a potential of each connection point of the semiconductor switches in the series-connected semiconductor switch circuit and a terminal of the bidirectional switch, the terminal being at a side unconnected to the DC power supply assembly, and
      a capacitor connected between the two output terminals;
   wherein the multilevel power converter responds to a request for a total phase interruption for forced shut down in a procedure of interrupting the semiconductor switches according to a predetermined sequential operation and finally interrupting the bidirectional switch.

2. The multilevel power converter according to claim 1, wherein
   the sequential operation to interrupt the semiconductor switches is carried out one by one with a predetermined time interval between interruption processes of each of the switches in an ON state.

3. The multilevel power converter according to claim 1, wherein the multilevel power converter includes five or more levels of power converter.

4. The multilevel power converter according to claim 2, wherein the multilevel power converter includes five or more levels of power converter.

* * * * *